W. V. TURNER.
FLUID PRESSURE BRAKE.
APPLICATION FILED JAN. 15, 1912.
1,108,949.        Patented Sept. 1, 1914.
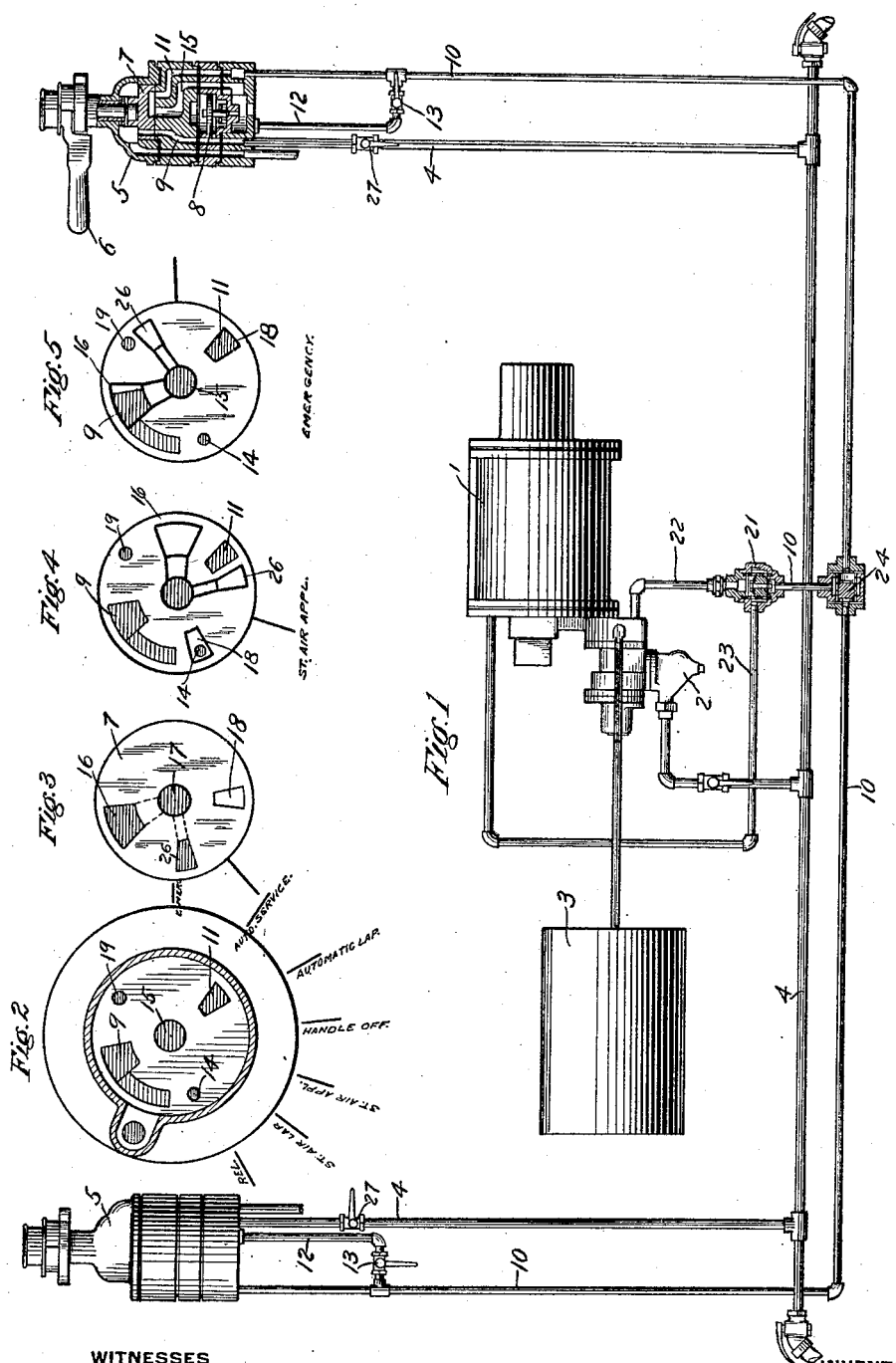

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,108,949.  Specification of Letters Patent.  Patented Sept. 1, 1914.

Application filed January 15, 1912. Serial No. 671,252.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a combined automatic and straight air brake.

With a brake equipment of the above type, the brake valve is provided with positions for controlling the brakes automatically and other positions for controlling the brakes by means of straight air, the automatic brakes being employed where two or more cars are operated, while straight air is ordinarily employed for one or possibly two car operation. It is customary to arrange the positions of the brake valve for combined automatic and straight air operation as follows: automatic and straight air release position, straight air lap, straight air application, automatic lap, automatic service application, and emergency application position, and with this arrangement it will be seen that in operating the brakes automatically, it is necessary to pass over the straight air positions in the movement from automatic release to automatic service application position and vice versa. In order to prevent flow of air to the brake cylinder in thus passing over the straight air positions, a cut-out cock is provided in the straight air pipe, which is closed when the brakes are operated automatically. A cut-out cock is also placed in the train pipe connection to the brake valve, so that the train pipe may be cut off from the brake valve at the non-operating end of the car in double end equipments and also on all cars which may be equipped with brake valves except the operating brake valve on the head car. It sometimes happens that the operator fails to turn the train pipe cut-out cock to its open position at the operating end of the car and as a consequence the brakes are not applied when the brake valve is operated in the usual manner for that purpose. In order to obviate this difficulty, it has been proposed to provide a straight air connection adapted in the automatic emergency position to supply fluid directly to the brake cylinder, so that if the cut-out cock in the train pipe happens to be closed, an application of the brakes may still be promptly obtained by moving the brake valve to emergency position. This feature is also desirable in case there is anything otherwise out of order with the automatic brake. As before explained, however, a cut-out cock is also provided in the straight air pipe and if this cut-out cock should also be closed, no brake would be obtained in emergency position.

The principal object of my invention is to provide a combined automatic and straight air brake equipment of the above character having cut-out cocks in the train pipe and straight air pipe and means for insuring an application of the brakes regardless of the positions of the cut-out cocks.

In the accompanying drawing; Figure 1 is a diagrammatic view of a combined automatic and straight air brake equipment with my improvement applied thereto; Fig. 2 a plan view of the rotary valve seat of the engineer's brake valve; Fig. 3 a face view of the rotary valve therefor; Fig. 4 a diagrammatic view, showing the relative positions of the ports in straight air service application position of the brake valve; and Fig. 5 a similar view, showing the parts in emergency application position.

As shown in Fig. 1 of the drawing, the combined automatic and straight air brake equipment may comprise the usual brake cylinder 1, triple valve 2, auxiliary reservoir 3, automatic train pipe 4 and a brake valve 5, preferably one at each end of the car. The brake valve 5 is provided with the usual operating handle 6 for actuating a rotary valve 7 and may be provided with the usual equalizing discharge valve mechanism 8 for controlling the discharge of air from the train pipe in making an automatic application of the brakes. The train pipe 4 is connected to a port 9 leading to the seat of the rotary valve 7 and a straight air pipe 10 is connected to a port 11 also leading to the seat of the rotary valve. A branch pipe 12 containing a cut-out cock 13 opens into the straight air pipe 10 and communicates with a port 14 in the rotary valve seat. The rotary valve seat also has an exhaust port 15 and a port 19 leading to the chamber above the equalizing discharge piston and the rotary valve 7 is provided with an exhaust cavity having an opening 16 and a central opening 17 adapted to register with the exhaust port 15, a through port 18, and a cavity 26 connected to port opening 17.

The operating positions of the brake valve are arranged in the order shown in Fig. 2 of the drawing, viz: release, straight air lap, straight air application, handle off position, automatic lap, automatic service application, and emergency application position. In automatic and straight air release position, the through port 18 in the rotary valve 7 registers with the train pipe port 9, so that fluid under pressure is supplied to the train pipe in the usual manner. Port opening 16 also registers with straight air port 11, so that the straight air pipe 10 is connected to the exhaust port 15. If the brakes are to be controlled automatically, the cut-out cock 13 is closed and to effect an automatic application of the brakes, the brake valve is turned to automatic service position, in which the port opening 16 in the rotary valve 7 is connected to port 19 leading to the chamber above the equalizing piston. Fluid is thereupon vented from said chamber and the equalizing discharge valve mechanism is operated in the usual manner to effect a reduction in train pipe pressure. When the desired reduction is effected, the brake valve handle is turned to automatic lap position. If the brakes are to be released, the brake valve is turned to release position, in which fluid is supplied to the train pipe and the pressure therein is increased to return the triple valve pistons to release position. It will now be noted that as the cut-out cock 13 is closed, no fluid can flow through the straight air pipe in operating the brakes automatically. If the brake valve is turned to emergency position, the port opening 16 registers with train pipe port 9, so that the train pipe pressure is rapidly reduced to effect an emergency application of the brakes. If the cut-out cock 27 in the train pipe should happen to be closed, it is evident that an emergency application of the brakes will not be obtained, but according to my improvement, in emergency application position, the through port 18 in the rotary valve 7 registers with the straight air port 11, so that fluid is supplied directly to the brake cylinder and an application of the brakes is obtained by means of straight air. It will thus be noted that the straight air cut-out cock 13 controls communication only through the straight air service connection, and that the straight air emergency pipe is always open.

A double check valve 21 controls communication from the automatic service pipe 22 and the straight air pipe 10 to the brake cylinder pipe 23, said double check valve being operated by the flow of air either from the automatic service pipe or from the straight air pipe to close communication from the other pipe, as the case may be.

A double check valve 24 is also placed in the straight air pipe 10, so that when one brake valve is being operated, the flow of air therefrom through the pipe 10 will operate the double check valve to close communication through said pipe to the other brake valve. In order to prevent the building up of pressure in pipe 10 on the side of the double check valve adjacent to the brake valve not in use, the exhaust cavity 26 in the rotary valve 7 is adapted to register with straight air port 11 in handle off position. If desired, the portion of straight air pipe 10 leading from the double check valve 24 to the brake valve not in use may be maintained at atmospheric pressure by providing a small exhaust port in the cut-out cock 13, adapted in the closed position of the cock to connect the pipe 10 with the atmosphere.

It will now be evident that while ordinarily the operator will open either the cut-out cock 27 on the head end of the car for automatic operation, or the straight air cut-out cock 13 for straight air control, as the case may be, if both cocks are inadvertently left closed, an application of the brakes may still be obtained through the always open straight air connection in the emergency application position of the brake valve.

Having now described my invention, what I claim as new and desire to secure by Letters Patent, is:—

1. In a combined automatic and straight air brake, the combination with a train pipe and a straight air pipe, of a brake valve provided with a straight air service port and a straight air emergency port and separate pipe connections from said ports to the straight air pipe.

2. In a combined automatic and straight air brake, the combination with a train pipe for controlling the brakes automatically and a straight air pipe, of a brake valve having a port for straight air service and a port for supplying straight air in emergency, said ports having separate pipe connections to the straight air pipe and a cut-out cock in the straight air service pipe connection.

3. In a combined automatic and straight air brake, the combination with a train pipe for controlling the brakes automatically and a straight air pipe, of a brake valve having an always open straight air pipe connection for supplying straight air in automatic emergency position and a straight air pipe connection containing a cut-out cock for supplying air in straight air service.

4. In a combined automatic and straight air brake, the combination with a train pipe provided with a cut-out cock and adapted for controlling the brakes automatically and a straight air pipe, of a brake valve having a pipe connection with the straight air pipe provided with a cut-out cock and adapted for straight air service and a free open pipe connection with said straight air pipe for supplying straight air in automatic emergency position.

5. The combination with a brake valve and brake cylinder, of a straight air pipe leading from the brake cylinder to the brake valve and having two branches for supplying straight air to the brake cylinder, one of which is provided with a cut-out cock.

6. The combination with a brake valve and brake cylinder, of a straight air pipe leading from the brake cylinder and having two branches each adapted to supply fluid to the brake cylinder and controlled by the brake valve, one branch containing a cut-out cock and the other being always open.

In testimony whereof I have hereunto set my hand.

WALTER V. TURNER.

Witnesses:
A. M. CLEMENTS,
CLYDE V. MCCURDY.